Jan. 16, 1968    R. A. GUNDERSON ETAL    3,363,917
MEANS FOR PROVIDING A DOCUMENT, SUCH AS A CHECK OR THE LIKE, WITH
A SURFACE FOR ENCODING MAGNETIC CHARACTERS OR INDICIA
Filed July 20, 1966

Inventors
Robert A. Gunderson
Wesley H. Larson
By Max R. Kraus, Atty

United States Patent Office 3,363,917
Patented Jan. 16, 1968

3,363,917
MEANS FOR PROVIDING A DOCUMENT, SUCH AS A CHECK OR THE LIKE, WITH A SURFACE FOR ENCODING MAGNETIC CHARACTERS OR INDICIA
Robert A. Gunderson, Homewood, and Wesley H. Larson, Chicago, Ill., assignors to Stikum, Inc., a corporation of Illinois
Filed July 20, 1966, Ser. No. 566,606
2 Claims. (Cl. 283—58)

ABSTRACT OF THE DISCLOSURE

This invention relates to the means for providing a document, such as a check or the like, with a surface for encoding magnetic characters or indicia.

---

Most bank checks and the like are processed through electronic data processing equipment. Accordingly, the checks thus processed each have encoded magnetic characters thereon which are made by a magnetic ink. The term Micro-Encoded refers to magnetic ink characters which are impressed on the check, usually along the bottom portion of the check. These characters denote the bank, the depositor, and other pertinent information and are a permanent part of the check. Before the check is processed through the data processing equipment the bank will also encode the amount of the check in encoding magnetic ink along the bottom portion of the check adjacent the other encoded indicia. Thus, when the check is processed through the check reading equipment to be read by said equipment the magnetic encoding indicia at the bottom of the check is the means by which the information on the check is read and recorded.

In normal practice a percentage of the checks are not readable by the electronic check reading equipment due to mutilation and/or improper encoding on the check. Such a check put through the machine would not be properly read or decoded and, accordingly, various means have been devised to overcome these shortcomings. The various means now in use have many shortcomings and are deficient in use. These shortcomings and deficiencies have been eliminated by the present invention.

The object of the present invention is to provide a very simple, inexpensive and foolproof means whereby a rejected check or document may be readily secured to a backing member which is provided with an encoding space whereby magnetic characters or indicia is encoded.

Other objects will become apparent as this description progresses.

Figure 1:
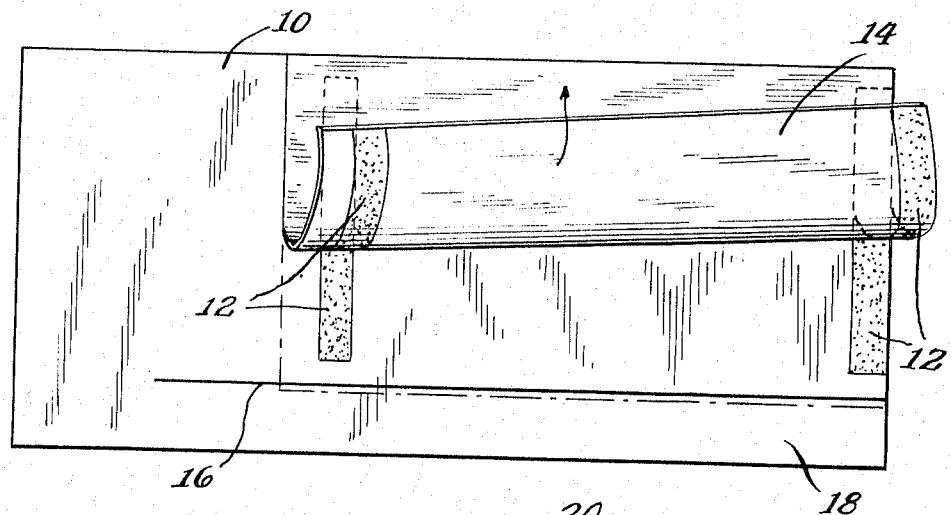
FIG. 1 is a view of the backing member with the protective covering partially detached therefrom.
Figure 2:
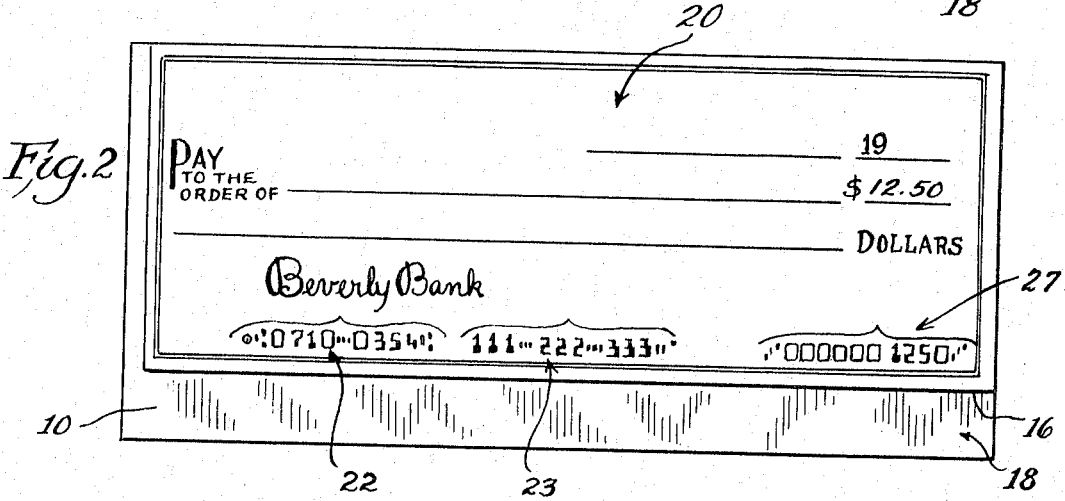
FIG. 2 is a view of the backing member with a check or like document attached thereto and showing the encoding space.
Figure 3:
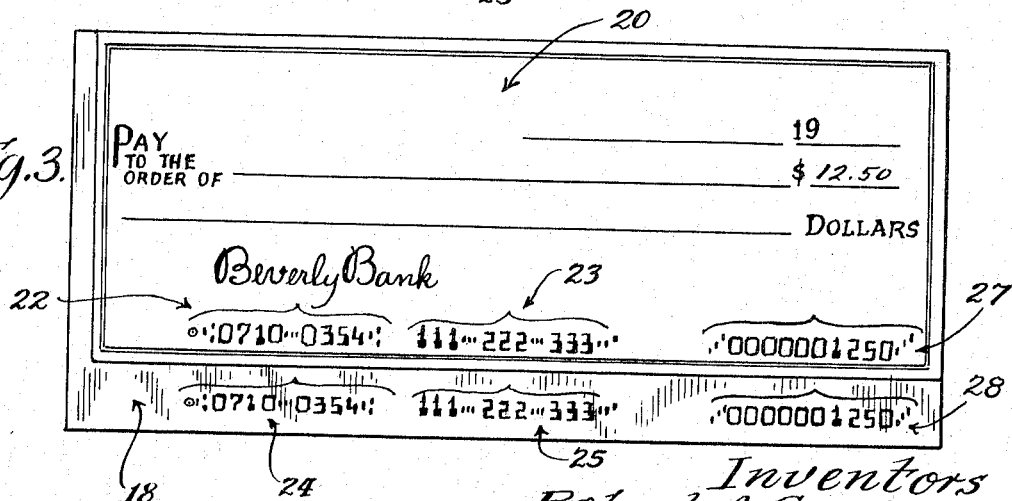
FIG. 3 is a view similar to FIG. 2 but with the encoded indicia on the encoding space.

The backing member or backing sheet, generally indicated at 10, is of a generally rectangular shape and is formed from a sheet of paper or thin paperboard. It is provided with a pressure sensitive adhesive on a portion of the face thereof which is designated by the numeral 12. The pressure sensitive adhesive may extend over a substantial portion of the backing sheet 10 or it may be along spaced sections. Another strip or sheet 14 which serves as a covering sheet is superimposed over the face of backing sheet 10 for the purpose of protecting the pressure sensitive adhesive surface or surfaces 12 while same is stored before use. The covering sheet 14 is removed when the rejected check or document is intended to be applied to the backing sheet 10.

A longitudinal line 16 spaced from the bottom edge of the backing sheet is imprinted on the backing sheet and this serves as a marking or registering line so as to locate the position of the bottom of the check or document. The space below the line 16 on the backing sheet is the encoding surface or encoding area on which is enclosed the magnetic characters or indicia. Said encoding space or surface is designated by the numeral 18.

The rejected check or document which is to be positioned on the backing sheet 10 is identified by the numeral 20. This check, as is true with most other checks, contains the encoded magnetic characters or indicia indicated by the numerals 22 and 23. The numeral 22 indicates the "transit number" field which identifies the bank. The numeral 23 indicates the "on us" field which identifies the customer's account number within the bank. These encoded magnetic characters or indicia are on the check when distributed to the customer. In addition, the bank will subsequently encode in magnetic ink on the check the "amount" field, indicated by the numeral 27. This corresponds to the amount of the check.

The rejected check or document 20 is positioned on the backing sheet 10 against the pressure sensitive surface 12 with the bottom of the check registering with the registry line 16. The backing sheet 10 with the check or document 20 attached is then put into an encoding machine where the magnetic characters or indicia in magnetic ink is applied on the encoding surface 18 of the sheet 10. The magnetic encoded characters or indicia 24 applied on the space 18 is a duplicate of the encoded characters 22 on the check or document 20. Likewise, the magnetic encoded characters or indicia 25 applied on the space 18 is the duplicate of the encoded characters 23. Also magnetically encoded in the space 18 of the backing sheet is the amount of the check, same being designated by the numeral 28. This would be a duplicate of the encoded characters 27.

The check or document 20 with the backing sheet 10 is then processed through the electronic check reading equipment which reads the magnetic encoded indicia 24, 25 and 28 and records same. After it has passed through the reading equipment the check 20 may be stripped off or removed from the backing sheet 10 and the sheet 10 may be destroyed. By having the check 20 on the backing sheet 10 with the encoded indicia 22, 23 and 27 of the check adjacent that of the encoded indicia 24, 25 and 28 on the backing sheet, both magnetic encoded items are simultaneously visible. This is an important advantage in reducing errors.

It will be understood that various changes and modifications may be made from the foregoing without departing from the spirit and scope of the appended claims.

What is claimed is:

1. In combination, a check and a backing member to which said check is detachably secured, said check being of generally rectangular shape and having encoded magnetic characters or indicia thereon, said backing member being of generally rectangular shape and having an upper area coated with pressure sensitive adhesive and a lower uncoated area whereby the check may be superposed on the backing member and detachably secured to said backing member, said check positioned on said backing member above the bottom edge of the backing member to expose the bottom and uncoated area of the backing member to provide a space below the bottom edge of the check for encoding magnetic characters or indicia on said space, whereby the encoded magnetic characters or indicia will be encoded on said space of the backing member below the magnetic encoded indicia of the check in juxtaposed relation to and in vertical alinement with the encoded magnetic indicia on the check as to be simultaneously visible therewith.

2. A structure defined in claim 1 in which a removable protective covering is positioned over the pressure sensitive surface of the backing member.

References Cited

UNITED STATES PATENTS 2,248,582 7/1941 Phillips _____ 281—25
2,274,944 3/1942 Trussell _____ 129—20

FOREIGN PATENTS 1,250,644 12/1960 France.

LAWRENCE CHARLES, *Primary Examiner.*